United States Patent
Zhang

(10) Patent No.: US 9,686,225 B2
(45) Date of Patent: Jun. 20, 2017

(54) METHOD AND SYSTEM FOR CONFIGURING MESSAGE TRACKING IN TELECOM SERVICE

(75) Inventor: Jiwei Zhang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 361 days.

(21) Appl. No.: 13/642,920

(22) PCT Filed: Jan. 30, 2011

(86) PCT No.: PCT/CN2011/070808
§ 371 (c)(1),
(2), (4) Date: Oct. 23, 2012

(87) PCT Pub. No.: WO2012/019447
PCT Pub. Date: Feb. 16, 2012

(65) Prior Publication Data
US 2013/0041944 A1 Feb. 14, 2013

(30) Foreign Application Priority Data
Aug. 9, 2010 (CN) .......................... 2010 1 0251402

(51) Int. Cl.
G06F 15/16 (2006.01)
H04L 12/58 (2006.01)
H04Q 3/00 (2006.01)

(52) U.S. Cl.
CPC ........... *H04L 51/34* (2013.01); *H04Q 3/0029* (2013.01)

(58) Field of Classification Search
USPC ................................................ 709/203, 204
See application file for complete search history.

(56) References Cited

U.S. PATENT DOCUMENTS

| 6,526,283 B1 | 2/2003 | Jang |
| 2002/0049815 A1 | 4/2002 | Dattatri |

(Continued)

FOREIGN PATENT DOCUMENTS

| CN | 101296119 A | 10/2008 |
| CN | 101631261 A | 1/2010 |

OTHER PUBLICATIONS

International Search Report in international application No. PCT/CN2011/070808, mailed on May 19, 2011.

(Continued)

*Primary Examiner* — Joseph Avellino
*Assistant Examiner* — Marshall McLeod
(74) *Attorney, Agent, or Firm* — Oppedahl Patent Law Firm LLC

(57) ABSTRACT

The disclosure discloses a method for configuring message tracking in a telecom service, comprising: a service module initiates a registration message to a tracking server, and synchronizes a tracking condition with the tracking server; a monitoring client initiates a registration message to the tracking server, and receives the tracking condition synchronously sent by the tracking server; and the monitoring client performs a configuration on the tracking condition, and sends a synchronization message of configuration information to the corresponding service module through the tracking server to complete the message tracking configuration. The disclosure further discloses a system for configuring message tracking in a telecom service. The method and system construct a general platform for the message tracking, which can integrate the message tracking of various different services. A new service module or a new monitoring client could be added more flexibly.

10 Claims, 2 Drawing Sheets

(56) References Cited

U.S. PATENT DOCUMENTS

| | | | |
|---|---|---|---|
| 2004/0122937 A1* | 6/2004 | Huang | H04L 12/2602 709/224 |
| 2005/0048971 A1* | 3/2005 | Findikli | G06F 21/10 455/435.1 |
| 2005/0091367 A1* | 4/2005 | Pyhalammi et al. | 709/224 |
| 2006/0045255 A1* | 3/2006 | Peters | H04M 3/523 379/265.09 |

OTHER PUBLICATIONS

English Translation of the Written Opinion of the International Search Authority in international application No. PCT/CN2011/070808, mailed on May 19, 2011.
Supplementary European Search Report in European application No. 10857159.7, mailed on Jul. 29, 2013.

* cited by examiner

METHOD AND SYSTEM FOR CONFIGURING MESSAGE TRACKING IN TELECOM SERVICE

TECHNICAL FIELD

The present disclosure relates to the field of telecom service products, and more particularly, to a method and system for configuring message tracking in a telecom service.

BACKGROUND

In the telecom service products, to acquire the operation state and other data of a service, it is required to track a message so as to subsequently analyze the operation of the service and further manage the service. Based on different focuses of tracking, the message tracking may be classified as tracking based on management and tracking based on message transmission.

The tracking method based on management focuses on the management operation process of a tracked service at a service node. Specifically, the method tracks the management of a tracked message at a single service node by the triggering of a message with specific content. For example, message tracking is only performed on the calling service of the mobile terminal at a specific network node rather than the calling service of the mobile terminal at other network nodes.

The tracking method based on the message transmission focuses on the tracking of specific message content, which may involve multiple service nodes. In the service execution process, a network node may trigger a specific message transmission between network nodes due to the receiving or sending of the specific message content, and the tracking of the above transmission process is based on the message transmission.

It can be seen from the above that, due to different focuses of the message tracking, the current message tracking platforms are separately set up according to the characteristics and management requirements of a service or a certain type of service, and are therefore incompatible with each other. With the rapid development of the telecom industry, more and more services of different types are available, and the types and contents of messages to be tracked in various services are different, therefore, a uniform general message tracking platform is urgently needed to implement the service tracking.

SUMMARY

In view of this, the main objective of the disclosure is to provide a general method and system for implementing message tracking, which is able to integrate the message tracking of various services, so as to solve the problem of incompatibility between current message tracking platforms.

In order to achieve the objective, following technical solutions of the disclosure are provided.

A method for configuring message tracking in a telecom service is provided, which includes following steps:

a service module initiates a registration message to a tracking server, and synchronizes a tracking condition with the tracking server;

a monitoring client initiates a registration message to the tracking server and receives the tracking condition synchronously sent by the tracking server; and the monitoring client configures a key value for the tracking condition and sends the key value to the corresponding service module through the tracking server in a synchronization message of configuration information to complete a message tracking configuration, then receives a configuration success message returned from the service module;

wherein the registration message initiated by the service module to the tracking server comprises: identity information and address information of the service module, and a name and/or type of a service performed by the service module.

The method may further include the following step that is performed after the step of sending the synchronization message of configuration information to the corresponding service module:

the monitoring client initiates the message tracking;

the service module tracks a message according to the configured tracking condition, and forwards tracking results to the corresponding monitoring client through the tracking server;

the monitoring client displays, analyzes and manages the tracking results; and the monitoring client sends a tracking stop message to the service module through the tracking server, and the service module stops tracking the message after the service module receives the tracking stop message.

The registration message initiated by the monitoring client to the tracking server may include: identify information and address information of the monitoring client.

The disclosure further provides a device for configuring message tracking in a telecom service, which includes:

a memory storing programming instructions; and a processor configured to be capable of executing the stored programming instructions to perform steps comprising:

initiating a registration message to a tracking server, synchronizing a tracking condition with the tracking sarver, and configuring a key value for the tracking condition, sending the key value in a synchronization message of configuration information to complete a message tracking configuration, and then generating a configuration success message;

wherein the registration message may comprise: identity information and address information of the processor, and a name and/or type of a service performed by the processor.

The device may further be configured to track a message according to the configured tracking condition, to forward tracking results, to display, analyze and manage the tracking results; and to generate a tracking stop message to stop tracking the message.

The present disclosure provides a solution for configuring message tracking in the telecom service: the service module initiates the registration message to the tracking server, and synchronizes the tracking condition with the tracking server; the monitoring client initiates the registration message to the tracking server, and receives the tracking condition synchronously sent by the tracking server; and the monitoring client performs the configuration on the tracking condition and sends the synchronization message of configuration information to the corresponding service module through the tracking server to complete the message tracking configuration. According to the above solution, a general platform for the message tracking is constructed, which is able to integrate the message tracking of various different services. A new service module or new monitoring client could be added more flexibly.

DETAILED DESCRIPTION

The technical solutions of the disclosure are further described in detail below in conjunction with drawings and specific embodiments.

Figure 1:
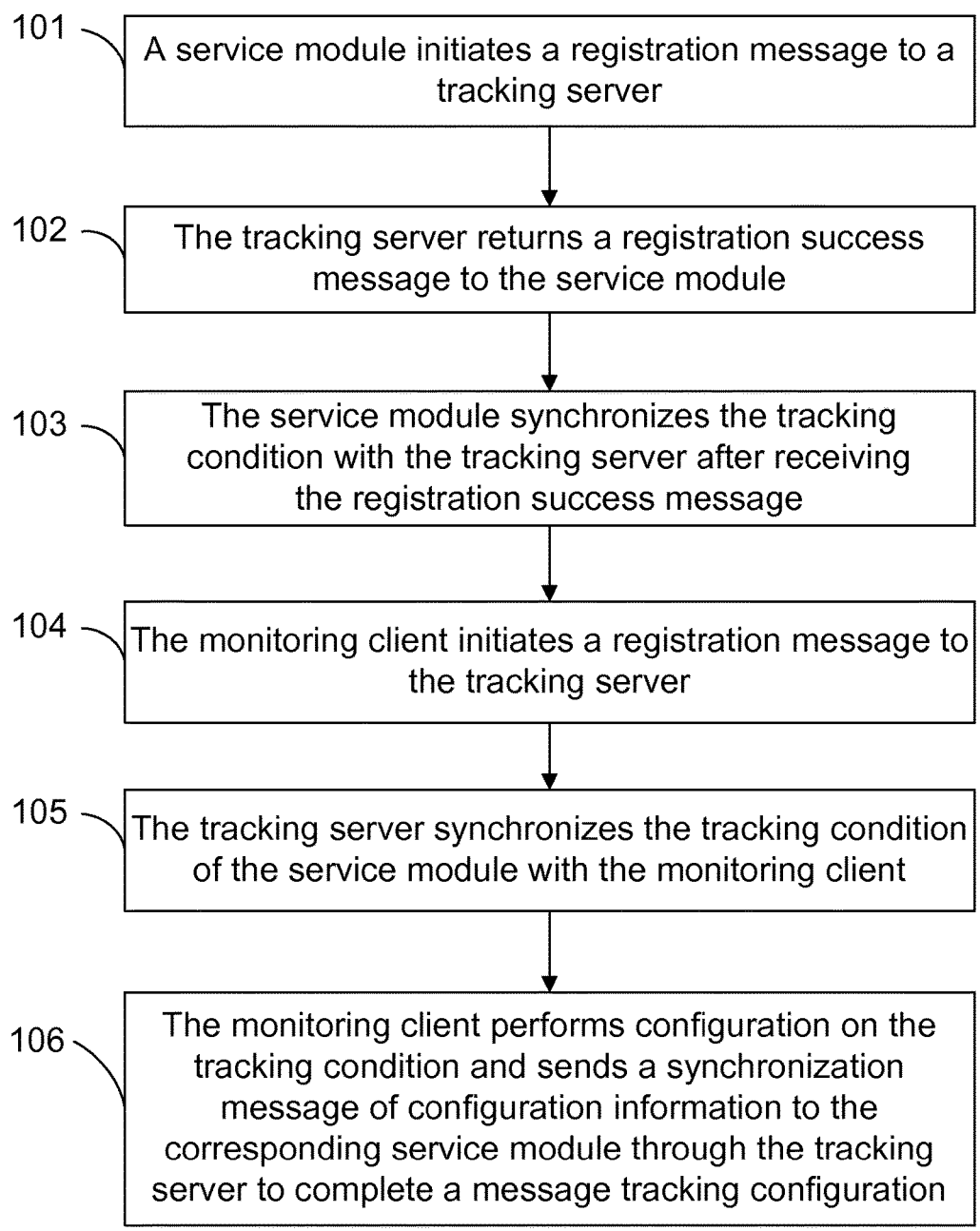
FIG. 1 is a flowchart of a method for configuring message tracking in a telecom service in one embodiment of the disclosure.

FIG. 1 is a flowchart of a method for configuring message tracking in a telecom service in one embodiment of the disclosure. As shown in FIG. 1, the method for configuring message tracking specifically includes following steps:

Step 101: A service module initiates a registration message to a tracking server.

Specifically, the service module may be a whole service system of a respective service, or be multiple separate sub-modules that are involved in the tracking in a service system. When the tracking focuses on the management of the whole service system, the whole service system may be regarded as a service module; and when the tracking focuses on the management of multiple separate sub-modules in the service system or on the message transmission between the sub-modules, the multiple sub-modules in the service system may be respectively regarded as the service module. The registration message initiated by the service module to the tracking server includes: identity information and address information of the service module, and a name and/or type of a service performed by the service module.

Step 102: The tracking server returns a registration success message to the service module.

Specifically, the tracking server saves the service name and/or service type in the registration message initiated by the service module, and then returns the registration success message to the service module.

Step 103: The service module synchronizes a tracking condition with the tracking server after receiving the registration success message.

Specifically, synchronizing the tracking condition with the tracking server includes following steps: the service module sends the tracking condition to the tracking server, the tracking server correlates the registration message with the tracking condition and then saves the registration message. The tracking condition may be a trackable message in the service performed by the service module. The trackable message may be the key identification field name of the trackable message and the XML format description document of the message structure of the trackable message.

Preferably, the synchronizing of the tracking condition with the tracking server by the service module may not be limited to be performed immediately after a successful registration, it can also be performed during the operation process of the service module, during which the service module synchronizes a new tracking condition with the tracking server.

Step 104: The monitoring client initiates a registration message to the tracking server.

Specifically, the registration message initiated by the monitoring client to the tracking server includes identify information and address information of the monitoring client.

Step 105: The tracking server synchronizes the tracking condition of the service module with the monitoring client.

Specifically, the tracking server saves the identity information and address information of the monitoring client in the registration message of the monitoring client, so as to synchronize the tracking condition of the service module that can be tracked by the tracking server with the monitoring client according to the address information. Wherein, the returned tracking condition is the key identification field name of the trackable message synchronized by the service module with the tracking server and the XML format description document of the message structure of the trackable message.

Preferably, the synchronizing of the tracking condition with the monitoring client by the tracking server may not be limited to be performed immediately after the registration, it may also be performed during the operation process of the service module, during which the tracking server may directly synchronize the tracking condition with the monitoring client after receiving the tracking condition synchronized by the service module.

Step 106: The monitoring client performs configuration on the tracking condition, and sends a synchronization message of configuration information to the corresponding service module through the tracking server to complete a message tracking configuration.

Specifically, the monitoring client may preferably adopt a Web displaying client, which displays a configuration interface after receiving the tracking condition. An administrator configures a key value for the key identification field of the trackable message through the configuration interface, and then sends the key value to the service module through the tracking server in the synchronization message of the configuration information. Since the tracking server has saved the registration messages of the service module and the monitoring client, the service module to which the key value is sent is the service module corresponding to the configured tracking condition. Besides the key value configured for the key identification field, the synchronization message of configuration information further includes the identity information and/or address information of the monitoring client that sends the configuration, according to which, the service module sends the tracking results to the monitoring client.

Preferably, to avoid failure in the message transmission among the service module, the tracking server and the monitoring client, the service module returns a configuration success message to the monitoring client after the service module completes the configuration of message tracking according to the received synchronization message of configuration information.

Figure 2:
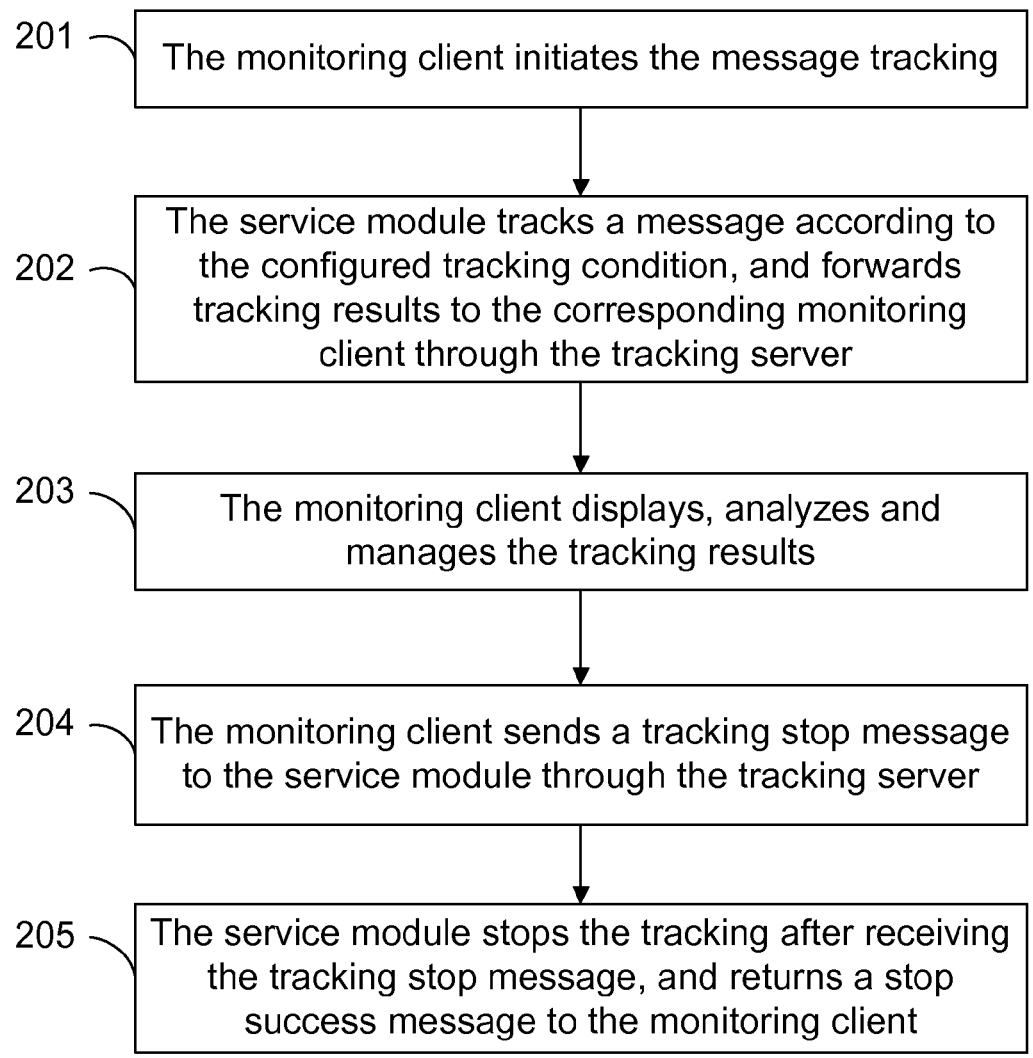
FIG. 2 is a flowchart of a method for executing message tracking in a telecom service in one embodiment of the disclosure.

FIG. 2 is a flowchart of a method for performing message tracking in a telecom service in one embodiment of the disclosure. As shown in FIG. 2, the method for performing message tracking specifically includes following steps:

Step 201: The monitoring client initiates the message tracking.

Specifically, when the message tracking needs to be initiated, the administrator sends a startup message to the service module through the monitoring client.

Step 202: The service module tracks a message according to the configured tracking condition, and forwards the tracking results to the corresponding monitoring client through the tracking server.

Specifically, the service module determines whether the key value of the key field in the message received and sent in its own service logic is equal to the configured key value; if so, the message is sent to the tracking server. Since the tracking server has saved the registration messages of the service module and the monitoring client, and the synchronization message of configuration information includes the identity information and/or address information of the monitoring client that sends the configuration, tracking results are forwarded to the corresponding monitoring client continuously.

Step 203: The monitoring client displays, analyzes and manages the tracking results.

Specifically, the monitoring client may preferably adopt a Web displaying client to display tracking results in a tree structure, so as to further analyze and manage the tracking results according to the policy preset by the administrator. The analyses are sorted according to such rule as time or size, so as to facilitate the further management of the administrator, such as saving some tracking results that are necessary to be saved.

Step 204: The monitoring client sends a tracking stop message to the service module through the tracking server.

Specifically, when the message tracking needs to be stopped, the administrator sends a tracking stop message to the service module through the monitoring client.

Step 205: The service module stops the tracking after receiving the tracking stop message, and returns a stop success message to the monitoring client.

Preferably, the methods in FIG. 1 and FIG. 2 further include a step: the tracking server keeps a Transmission Control Protocol (TCP) long link with one or more service modules and one or more monitoring clients. The TCP long link is different from a TCP short link. The TCP short link is automatically disconnected after the service completes, while the TCP long link remains connected in a long term and its disconnection is independent of the completion of the service, instead, it depends on the device establishing the TCP long link. Any monitoring client can be connected with the tracking server at any time, and acquire by synchronization the tracking condition of the service module registered in the tracking server, thus, it is necessary to keep the link normal. A preferred solution is that the service module and the monitoring client may periodically detect the heartbeat message of the tracking server respectively. When the heartbeat message is received normally, it means the link is normal. When the heartbeat message is not received normally, it means the link is disconnected, and the service module or monitoring client that fails to receive the heartbeat message will re-initiate a link with the tracking server automatically.

Figure 3:
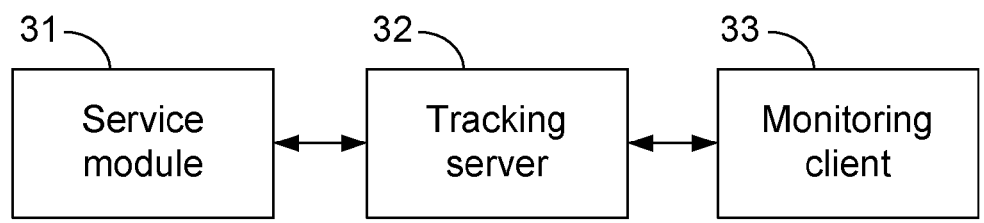
FIG. 3 is a structural diagram of a system for configuring message tracking in a telecom service in one embodiment of the disclosure.

FIG. 3 is a structural diagram of a system for configuring message tracking in a telecom service in one embodiment of the disclosure. As shown in FIG. 3, the system for message tracking includes a service module 31, a tracking server 32 and a monitoring client 33.

The service module 31 is configured to initiate a registration message to the tracking server 32, to synchronize a tracking condition with the tracking server 32, and to receive a synchronization message of configuration information sent by the tracking server 32 to complete the configuration of message tracking.

Specifically, the service module 31 may be a whole service system of a respective service, or be multiple separate sub-modules that are involved in the tracking in a service system. When the tracking focuses on the management of the whole service system, the whole service system may be regarded as a service module 31; and when the tracking focuses on the management of multiple separate sub-modules in the service system or on the message transmission between the sub-modules, all the multiple sub-modules in the service system may be respectively regarded as the service module 31. The registration message initiated by the service module 31 to the tracking server 32 includes: the identity information and address information of the service module 31, and a name and/or type of a service performed by the service module.

Synchronizing the tracking condition with the tracking server 32 includes the following steps: the service module 31 sends the tracking condition to the tracking server 32, the tracking server 32 correlates the registration message with the tracking condition and then saves the registration message. The tracking condition may be a trackable message in the service performed by the service module 31. The trackable message may be the key identification field name of the trackable message and the XML format description document of the message structure of the trackable message.

Preferably, the synchronizing of the tracking condition with the tracking server 32 by the service module 31 may not be limited to be performed immediately after a successful registration, it can also be performed during the operation process of the service module 31, during which the service module 31 synchronizes a new tracking condition with the tracking server 32.

Preferably, to avoid failure in the message transmission among the service module 31, the tracking server 32 and the monitoring client 32, the service module 31 is further configured to return a configuration success message to the monitoring client after the service module 31 completes the configuration of message tracking according to the received synchronization message of configuration information.

The tracking server 32 is configured to receive a registration message from the service module 31 and a registration message from the monitoring client 33, and to synchronize the tracking condition, obtained by synchronizing with the service module 31, with the monitoring client 33.

Specifically, the tracking server 32 saves the service name and/or service type in the registration message initiated by the service module 31, and then returns the registration success message to the service module 31.

The tracking server 32 saves the identity information and address information of the monitoring client in the registration message of the monitoring client 33, so as to synchronize the tracking condition of the service module which can be tracked by the tracking server 32 with the monitoring client 33 according to the address information. The returned tracking condition is the key identification field name of the trackable message synchronized by the service module 31 with the tracking server 32 and the XML format description document of the message structure of the trackable message.

Preferably, the synchronizing of the tracking condition with the monitoring client 33 by the tracking server 32 may not be limited to be performed immediately after the registration, it may also be performed during the operation process of the service module 31, during which the tracking server 32 may directly synchronize the tracking condition with the monitoring client 33 after receiving the tracking condition synchronized by the service module 31.

The monitoring client 33 is configured to initiate the registration message to the tracking server 32, to perform the configuration on the tracking condition, and to send the synchronization message of configuration information to the corresponding service module 31 through the tracking server 32 to complete a message tracking configuration.

Specifically, the registration message initiated by the monitoring client 33 to the tracking server 32 includes the identify information and address information of the monitoring client.

The monitoring client 33 may preferably adopt a Web displaying client, which displays a configuration interface after receiving the tracking condition. An administrator configures a key value for the key identification field of the trackable message through the configuration interface, and then sends the key value to the service module 31 through the tracking server 32 in the synchronization message of the configuration information. Since the tracking server 32 has saved the registration messages of the service module 31 and the monitoring client 33, the service module 31 to which the key value is sent is the service module 31 corresponding to the configured tracking condition. Besides the key value configured for the key identification field, the synchronization message of configuration information further includes the identity information and/or address information of the monitoring client 33 that sends the configuration, according to which, the service module 31 sends the tracking results to the monitoring client 33.

Preferably, in the system, the service module 31 is further configured to track a message according to the configured tracking condition, to forward the tracking results to the corresponding monitoring client 33 through the tracking server 32, and to stop tracking the message after receiving a tracking stop message.

Specifically, the service module 31 determines whether the key value of the key field in the message sent and received in its own service logic is equal to the configured key value, if so, the message is sent to the tracking server 32. Since the tracking server 32 has saved the registration messages of the service module 31 and the monitoring client 33, and the synchronization message of configuration information includes the identity information and/or address information of the monitoring client 33 that sends the configuration, tracking results are forwarded to the corresponding monitoring client 33 continuously.

The monitoring client 33 is further configured to initiate the message tracking, to display, analyze and manage the tracking results, and to send a tracking stop message to the service module 31 through the tracking server 32.

Specifically, when the message tracking needs to be initiated, the administrator sends a startup message to the service module 31 through the monitoring client 33. When the message tracking needs to be stopped, the administrator sends a tracking stop message to the service module 31 through the monitoring client 33.

The monitoring client 33 may preferably adopt a Web displaying client to display tracking results in a tree structure, so as to further analyze and manage the tracking results according to the policy preset by the administrator. The analyses are sorted according to such rule as time or size, so as to facilitate the further management of the administrator, such as saving some tracking results that are necessary to be saved.

Preferably, in the system shown in FIG. 3, the tracking server 32 respectively keeps a TCP long link with one or more service modules 31 and one or more monitoring clients 33. Any monitoring client 31 can be connected with the tracking server 32 at any time, and acquire by synchronization the tracking condition of the service module 31 registered in the tracking server 32, thus, it is necessary to keep the link normal. A preferred solution is that the service module 31 and the monitoring client 33 may periodically detect the heartbeat message of the tracking server 32 respectively. When the heartbeat message is received normally, it means the link is normal. When the heartbeat message is not received normally, it means the link is disconnected, and the service module 31 or the monitoring client 33 that fails to receive the heartbeat message will re-initiate a link with the tracking server 32 automatically.

What described above are only preferred embodiments of the disclosure, and not intended to limit the scope of protection of the disclosure. Any modifications, equivalent replacements, improvements and the like made within the principle of the disclosure shall fall within the scope of protection of the disclosure.

The invention claimed is:

1. A method for configuring message tracking in a telecom service, comprising: initiating, by a service module, a registration message to a tracking server, and synchronizing a tracking condition with the tracking server; initiating, by a monitoring client, a registration message to the tracking server, and receiving the tracking condition synchronously sent by the tracking server; and configuring, by the monitoring client, a key value for a key identification field of the tracking condition, and sending the key value to the corresponding service module through the tracking server in a synchronization message of configuration information to complete a message tracking configuration, then receiving a configuration success message returned from the service module; determining, by the service module, whether the key value of the key field in the message received and sent in its own service logic is equal to the configured value and upon a determination of equality, sending the message to the tracking server; wherein the registration message initiated by the service module to the tracking server comprises: identity information and address information of the service module, and a name and/or type of a service performed by the service module; wherein besides the key value configured for the key identification field, the synchronization message of configuration information further includes the identity information and/or address information of the monitoring client which sends the synchronization message of configuration information; wherein the tracking condition is a trackable message in the service performed by the service module; wherein the trackable message comprises: a key identification field name of a trackable message in a service executed by the service module and an Extensible Markup Language (XML) format description document of a message structure of the trackable message.

2. The method according to claim 1, further comprising the step, performed after the step of sending the synchronization message of configuration information to the corresponding service module, of:
   initiating, by the monitoring client, the message tracking;
   tracking, by the service module, a message according to the configured tracking condition, and forwarding tracking results to the corresponding monitoring client through the tracking server;
   displaying, analyzing and managing the tracking results by the monitoring client; and
   sending, by the monitoring client, a tracking stop message to the service module through the tracking server, and stopping, by the service module, tracking the message after the service module receives the tracking stop message.

3. The method according to claim 1, wherein the registration message initiated by the monitoring client to the tracking server comprises identify information and address information of the monitoring client.

4. A device for configuring message tracking in a telecom service, comprising: a memory storing programming instructions; and a processor configured to be capable of executing the stored programming instructions to perform steps comprising: initiating a registration message to a tracking server; synchronizing a tracking condition with the tracking server; and configuring a key value for a key identification field of the tracking condition, sending the key value in a synchronization message of configuration information to complete a message tracking configuration, and then generating a configuration success message; determining whether the key value of the key field in the message received and sent in its own service logic is equal to the configured value and upon a determination of equality, sending the message to the tracking server; wherein the registration message comprises: identity information and address information of the processor, and a name and/or type of a service performed by the processor; wherein besides the key value configured for the key identification field, the synchronization message of configuration information further includes the identity information and/or address information of the monitoring client which sends the synchronization message of configuration information; wherein the tracking condition is a trackable message in the service performed by the service module; wherein the trackable message comprises: a key identification field name of a trackable message in a service executed by the service module and an Extensible Markup Language (XML) format description document of a message structure of the trackable message.

5. The device according to claim 4, wherein the processor is further configured to be capable of executing the stored programming instructions to perform steps further comprising:
tracking a message according to the configured tracking condition, and forwarding tracking results;
displaying, analyzing and managing the tracking results; and
generating a tracking stop message to stop tracking the message.

6. The device according to claim 4, wherein the registration message comprises identify information and address information of the processor.

7. The method according to claim 2, wherein the registration message initiated by the service module to the tracking server comprises: identity information and address information of the service module, and a name and/or type of a service performed by the service module.

8. The method according to claim 2, wherein the registration message initiated by the monitoring client to the tracking server comprises identify information and address information of the monitoring client.

9. The device according to claim 5, wherein the registration message comprises: identity information and address information of the processor, and a name and/or type of a service performed by the processor.

10. The device according to claim 5, wherein the registration message comprises identify information and address information of the processor.

\* \* \* \* \*